United States Patent [19]

Gschwend et al.

[11] Patent Number: 4,840,527
[45] Date of Patent: Jun. 20, 1989

[54] EXPANSION DOWEL ASSEMBLY

[75] Inventors: Hans Gschwend, Mauren; Hans Hachtel, Schaanwald; Werner Wanger, Mauren, all of Liechtenstein

[73] Assignee: Hilti Aktiengesellschaft, Fürstentum, Liechtenstein

[21] Appl. No.: 136,551

[22] Filed: Dec. 22, 1987

[30] Foreign Application Priority Data

Dec. 22, 1986 [DE] Fed. Rep. of Germany ....... 3643911

[51] Int. Cl.$^4$ .............................................. F16B 21/00
[52] U.S. Cl. ...................................... 411/344; 411/21; 411/913
[58] Field of Search ................. 411/344, 21, 108, 172, 411/173, 182, 508, 509, 510, 913, 970

[56] References Cited

U.S. PATENT DOCUMENTS

| 1,247,621 | 11/1917 | Bennett | 411/344 |
| 1,370,319 | 3/1921 | Kennedy | 411/913 |
| 3,241,420 | 3/1966 | Passer . | |
| 3,304,828 | 2/1967 | Karhu | 411/21 |
| 3,312,138 | 4/1967 | Cumming | 411/21 |
| 3,316,953 | 5/1967 | Fransson et al. | 411/108 |
| 3,599,693 | 8/1971 | Bucheli | 411/108 |
| 4,083,162 | 4/1978 | Regan et al. | 411/913 |
| 4,143,581 | 3/1979 | Smith et al. | 411/913 |
| 4,557,653 | 12/1985 | Hill | 411/509 |
| 4,673,320 | 6/1987 | Froehlich | 411/21 |

FOREIGN PATENT DOCUMENTS 1270522 4/1972 United Kingdom .................. 411/21

*Primary Examiner*—Victor N. Sakran
*Attorney, Agent, or Firm*—Toren, McGeady & Associates

[57] ABSTRACT

An expansion dowel assembly includes a sleeve-like support bearing incorporating load engagement surfaces, and annular disks displaceably held on the support bearing by a tension member for displacement between a radially inwardly displaced position and a radially outwardly displaced position. The annular disks are formed of a spring-like material. The tension member clamps the disks in the radially inwardly displaced position in the form of a hollow cone. When the clamping force on the disks is removed, because of their spring-like characteristic, they move into the radially outwardly displaced position flattened out from the hollow cone configuration. A load can be applied to the support bearing at the load engagement surfaces.

12 Claims, 2 Drawing Sheets

U.S. Patent  Jun. 20, 1989  Sheet 1 of 2  4,840,527
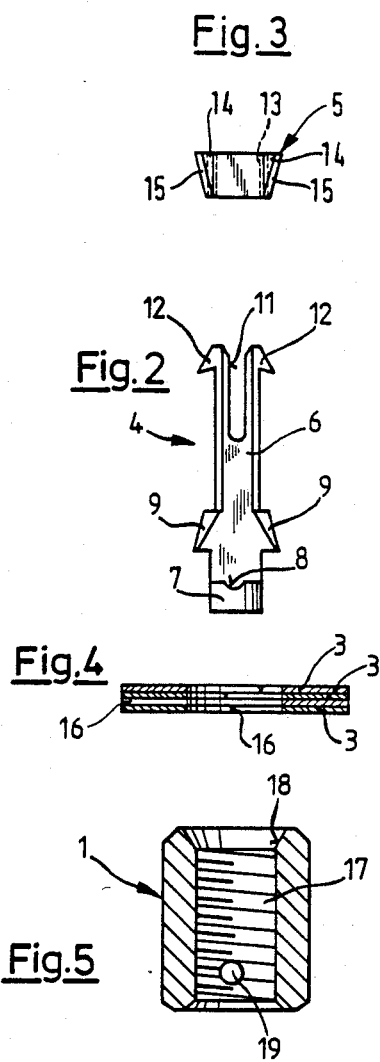

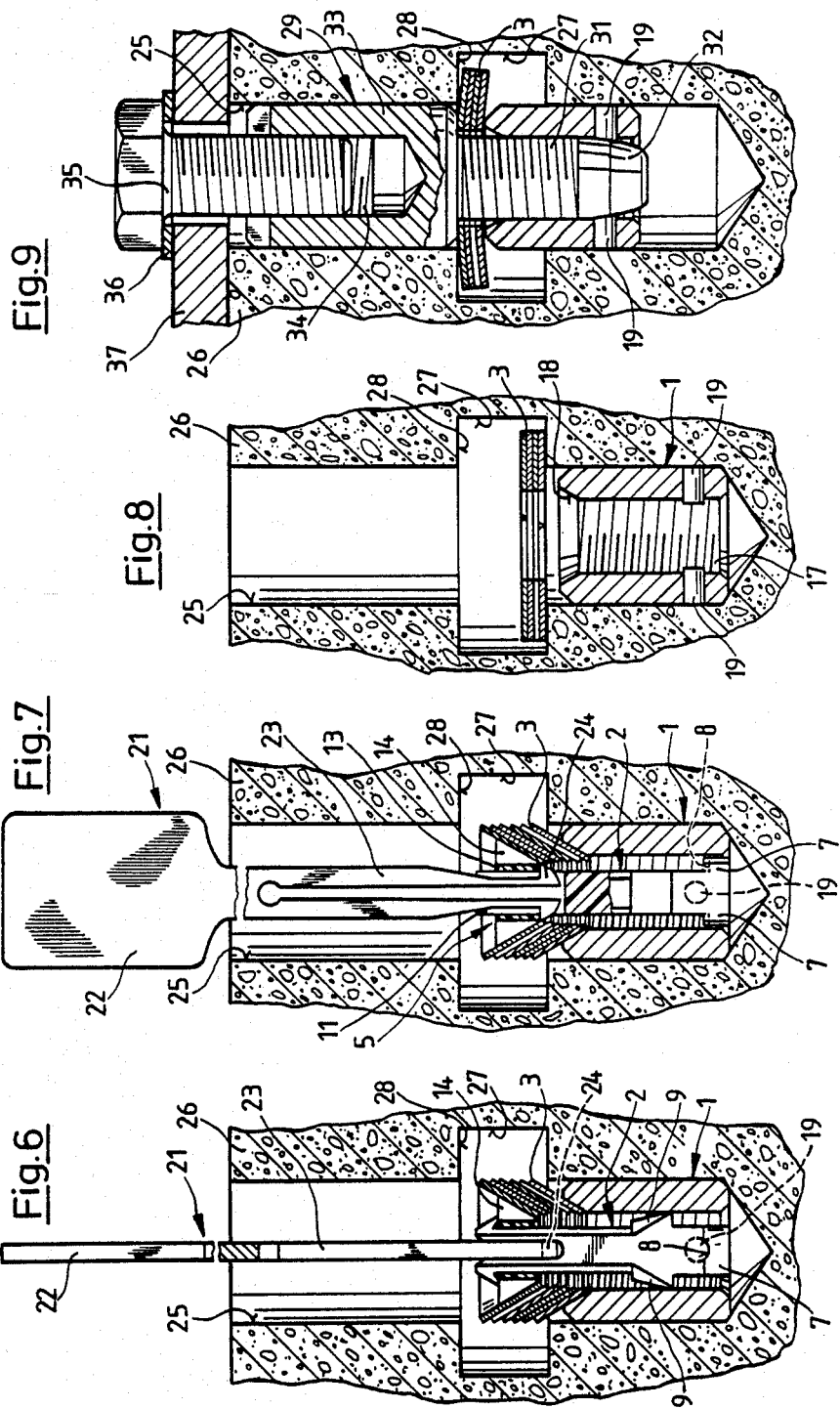

EXPANSION DOWEL ASSEMBLY

BACKGROUND OF THE INVENTION

The present invention is directed to an expansion dowel assembly with expansion members displaceable radially outwardly under spring tension, a support bearing including load engagement surfaces located, in the assembly, ahead of the expansion member in the insertion direction of the dowel into a receiving material, and a detachable tension member clamps the expansion members in a radially inward position so that the assembly can be inserted into a bore hole.

Expansion dowels which penetrate into a bore hole in a receiving material axially abut at shoulders within the bore hole in a positive locking manner are used increasingly in crack-prone regions for fastening objects to the receiving material, such as concrete. The shoulders can be in the form of a widened undercut in the bore hole or of the inner side of the receiving material penetrated by the bore hole.

Such an expansion dowel is disclosed in U.S. Pat. No. 3,241,420 and includes a support bearing for two-arm expansion members pivoted so that they can be displaced outwardly diametrically opposite one another under spring tension. The support beings also has load engagement means in the form of an internal thread into which a bolt or fastening member can be screwed for securing a load to the expansion member down. A tension member retains the expansion member under an elastic force in an inwardly shifted position when the dowel is inserted into a bore hole, thereby preventing the development of frictional forces between the expansion members and the surface of the bore hole. After the free ends of the expansion members have reached the shoulder formed, for instance, by the inner side of the receiving material, the expansion members are released by an auxiliary tool through the displacement of the support bearing.

The outward displacement of the expansion member is limited by abutment means. Because of the abutment means, the known expansion dowel has one single defined expansion position where it abuts rigidly against the receiving material in the direction opposite to the insertion direction into the material. Accordingly, problems develop under dynamic loading and there is no possibility to compensate for relaxation of the receiving material. Moreover, the contacting abutment of the free ends of the expansion member against the receiving material leads to high specific compression stresses in the expansion member and in the receiving material.

SUMMARY OF THE INVENTION

Therefore, it is the primary object of the present invention to provide an expansion arrangement for effecting positive locking abutment at shoulders located within the receiving material so that the dowel assembly is suitable for supporting dynamic loads and for compensating for the relaxation of the receiving material. In addition, the expansion dowel assembly prevents excessive compression stresses.

In accordance with the present invention, the expansion arrangement is provided by a number of radially slotted annular disks made of spring steel and clamped between a support bearing and a tension member so that the disks are held in a radially inwardly displaced position. Preferably, a plurality of the annular disks are stacked one on top of the other to form a package with the slots of the individual disks staggered or offset in the circumferential direction relative to one another so that the slots are spaced apart. To introduce the expansion dowel assembly into a bore hole in a receiving material, the external diameter of the annular disks in the radially inwardly displaced position must be smaller than the diameter of the bore hole. By displacing the free region of the annular disk produced by the slotting operation over each other in the circumferential direction, the annular disk can be placed in the form of a hollow cone with a smaller radially outer diameter than the original undisplaced shape of the annular disks. In the conical form, the annular disks are held for insertion into a bore hole between the support bearing and the tension member. After the annular disks have been inserted past a shoulder in the bore hole in the receiving material, the tension or clamping action on the annular disks is released and they shift automatically radially outwardly. Accordingly, the annular disks can be placed into bearing contact with the shoulder within the receiving material for effecting a positive locking action.

After the tension member has been removed, a connecting member for attaching a load to the dowel, such as a bolt or stud, can be engaged with the load application surfaces in the support bearing. Tension stress transmitted by the connecting member to the support bearing is transmitted from the bearing to the annular disks and from the disks into abutment with the shoulder in the bore hole of the receiving material. The annular disks abut against the shoulder with a circumferentially extending abutment surface.

A sufficient tensile stress can be supplied by the connecting member to cause a partial pulling of the annular disks near the center into the bore hole between the shoulder and the opening into the bore hole for securing the load to the expansion dowel assembly. In such attachment, the annular disks are elastically deformed in a cone-like manner and can assume an undulating shape in the circumferential direction.

A pre-stress is produced by this deformation and compensates for any possible relaxation of the receiving material and also for supporting dynamic loads.

The tension member is connected with the support bearing so that it is not displaceable in the axial direction for inserting the expansion dowel assembly into a bore hole with the annular disks centrally arranged and held against the support bearing. The annular disks are pressed by the tension member against the support bearing and maintained in a prestressed condition. The engagement between the tension member and the annular disks is preferably closer to the center of the disks than the engagement between the support bearing and the annular disks. Accordingly, the annular disks are clamped in an umbrella fashion in the form of a hollow cone in the support bearing.

Preferably, the engagement surface of the tension member is provided by a surface on the tension member at least partially widening in a conical fashion toward the annular disks. As a result, a conical engagement of the tension member with the hollow conical annular disk is achieved so that undesirable deformation of the disks is avoided, since they are supported against the surfaces of the tensioning member. The conically-shaped surface of the tension member can be formed by flanks on support ribs located on the outer surface of the tension member, and such an arrangement is advantageous from a fabrication point of view if the tension member is an injection molded part. To prevent undesirable deformation of the annular disks, the surfaces of engagement with the support bearing are provided in contact with a conically shaped surface in an end face of the support bearing.

For ease and handling in the insertion of the expansion dowel assembly into the receiving material, the tension member and the support member form coupling means for locking the annular disks in the radially inwardly displaced position. The coupling means are detachable and preferably are in the form of a bayonet lock.

To facilitate the uncoupling of the tension member and the support bearing, tension means are provided at the support bearing which engage the surface of the bore hole and prevent rotation of the support bearing during the connection of a load or object to the dowel assembly. Such tension means can be elastic O-rings or jagged protrusions.

The bayonet lock-like coupling is advantageously formed by radially displaceably lugs in the support bearing which protrude into a central bore in the bearing whereby the lugs can be displaced radially outwardly beyond the outside surface of the bearing. After the uncoupling and removal of the tension member, the connecting member is introduced through the annular disks into the support bearing. Accordingly, the connecting member abuts against the lugs and forces them radially outwardly against the surface of the bore hole. In this manner, the support bearing is secured against rotating in the bore hole when the connecting member is being engaged with it. The connecting member can have a conical extension at its leading end for displacing the lugs radially outwardly so that a relatively large displacement travel of the lugs can be effected.

The various features of novelty which characterize the invention are pointed out with particularity in the claims annexed to and forming a part of this disclosure. For a better understanding the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an axially extending sectional view of an expansion dowel assembly embodying the present invention;

FIG. 2 is an elevational view of the tension member of the expansion dowel assembly;

FIG. 3 is an elevational view of a tensioning sleeve for the tension member;

FIG. 4 is a sectional view of a package of annular disks in the flattened or undisplaced condition;

FIG. 5 is an axially extending sectional view of a support bearing of the expansion dowel assembly; and FIGS. 6–9 are views extending in the axial or insertion direction of the dowel assembly into a receiving material with parts of the assembly shown in sections and indicating the various steps in the placement and use of the expansion dowel assembly.

DETAILED DESCRIPTION OF THE INVENTION

An expansion dowel assembly ready to be inserted into a bore hole in a receiving material is shown in FIG. 1 with the lower end of the assembly being its leading end and the upper end of the assembly being its trailing end and with the parts making up the assembly having comparable leading ends and trailing ends. The expansion dowel assembly is made up of an axially extending sleeve-like support bearing 1, an axially elongated tension member 2, and a plurality of stacked annular disks 3, placed one on top of the other to form a package.

The tension member 2 includes an axially extending locking part 4, illustrated in FIG. 2, and a tension sleeve 5, displayed in FIG. 3. In the assembled arrangement, the sleeve 5 is displaceably mounted on the trailing end of the locking part 4. Locking part 4 and sleeve 5 are produced as injection moldings from plastics material for affording ease in manufacture.

Locking part 4 is formed of an elongated shaft 6 with an essentially square transverse cross-section. At the leading end of the shaft, two support arms 7 are provided, each extending laterally outwardly from the shaft and located opposite one another. The support arms facing in the trailing and direction of the shaft are provided with radially extending snap-in recesses 8, note FIGS. 1 and 2. Two abutment shoulders 9 extend outwardly from the shaft 6, and are located between the support arms 7 and the trailing end of the shaft 6. The abutment shoulders have a conically-shaped outer surface facing outwardly from the shaft. Shaft 6 is divided in the elongated direction into two parts by an elongated notch 11, extending from the trailing end toward the shoulders 9 and due to the notch, the trailing end portion of the shaft 6 has radial springiness. At the trailing end of the shaft, two support noses 12 project outwardly from the shaft. Tension sleeve 5 includes a guidance tube 13 extending in the trailing end-leading end direction with a square inner surface corresponding to the transverse cross-section of the shaft 6. Support ribs 14 are located at the corners of the guidance tube 13 and extend outwardly from the tube. Ribs 14 have flanks 15 extending in the trailing end-leading end direction and flaring outwardly toward the trailing end. The flanks 15 form surfaces facing the leading end of the dowel assembly and, as can be seen in FIG. 1, facing toward the trailing surfaces of package of annular disks 3. The surfaces of the flanks 15 form a partial surface of a cone.

When the tension member is assembled, the support noses 12 of the locking part 4, abut the trailing end of the guidance tube 13 effecting an inward compression of the shaft 6 in the trailing end region of the notch 11. As soon as the tension or clamping sleeve 5 has passed over the support noses, the shaft rebounds outwardly due to its inherent springiness. Accordingly, the sleeve 5 is held in a nonrotatable manner between the support noses 12 and the abutment shoulders 9 and is spaced from the shoulders.

In FIG. 4, a package of flat annular disks 3 formed of a spring-plate material are stacked one on top of the other and each disks has a radially continuous slot 16. The slot 16 in the annular disks 3 are located in angularly spaced position relative to one another.

In FIG. 5, the support bearing 1 is illustrated and is sleeve-shaped or tubular and has a central bore with a continuous inside thread 17 forming an attachment surface. At its trailing end, the central bore opens into a conically-shaped countersunk recess 18. Adjacent the leading end of the support bearing 1, there are two lugs 19 located diametrically opposite one another and protruding inwardly into the central bore. As shown in FIG. 1, the lug 19 engages in the recess 8.

When the expansion dowel assembly is ready to be inserted into a bore hole in the receiving material, the tension member 2 is detachably coupled with the support bearing 1 with the trailing end surfaces of the support arms 7 abutting the lugs 19 and with the lugs seated in the snap-in recesses 8.

The tension member 2 is placed in this position by pushing the locking part 4 with the support noses 12 forward into the support bearing 1 until the support arms 7 contact the lugs 19. The shaft 6 of the tension member 2 extends through the openings in the annular disks 3 and the annular disks are displaced into the hollow conical shape, note FIG. 1, and are retained against the conically-shaped surface of the recess 18, and the conically-shaped surfaces of the flanks 15 on the clamping sleeve 5. The support noses press the sleeve 5 against the trailing face surface of the package of annular disks 3. In this position, the support arms 7 are located between the leading end of the assembly and the lugs 19, with the support noses 12 gripping the tension sleeve 6 at the trailing end of the assembly. Tension member 2 is held in this coupled position by the pre-stressing force of the annular disks 3, displaced into the radially inner position relative to the flattened position as shown in FIG. 4. The package of annular disks bears at the leading end in the conically-shaped recess 18 in the trailing end of the support bearing 1, constituting the leading end engagement surfaces and at the opposite end, against the concially-shaped flanks 15 of the clamping sleeve 5, providing the trailing end engagement surfaces with the sleeve 5, held by the support noses 12. As can be seen in FIG. 1, the trailing end engagement surfaces of the annular disks extend further radially outwardly than the leading engagement surfaces with the conically-shaped recess 18. In this radially inwardly displaced position, the outside diameter of the conically-deformed annular disks does not project radially outwardly beyond the circumferentially extending outside surface of the support bearing 1.

As displayed in FIGS. 6 and 7, an insertion tool 21 is used in the placement of the expansion dowel assembly into a prepared bore hole 25 in the receiving material 26 illustrated as concrete. Insertion tool 21 is formed of a flat material and has a trailing handle part 22 with an integral retaining finger 23 extending from the handle. The retaining finger 23 is slotted in the leading end-trailing end direction from the leading end and, as a result, has springy or flexural properties. At its leading end, the finger 23 has two noses 24 projecting laterally outwardly, note FIG. 7. To push the expansion dowel assembly into the bore hole 25, the retaining finger 23 of the insertion tool 21 is introduced into the notch 11 in the locking part 4 until the noses 24 on the retaining finger 23 grip the leading end of the guidance tube 13 of the sleeve 5. As shown in FIG. 6, the expansion dowel assembly is inserted into the bore hole 25 until it abuts against the base of the bore hole. Bore hole 25 extends into the receiving material 26, and has a widened undercut 27, which forms a annular shoulder 28 at the trailing end of the undercut. In the inserted condition of the expansion dowel assembly, the annular disks 3 are located in the axially extending region of the widened under cut 27.

After the expansion dowel assembly is inserted into the bore hole, the insertion tool is rotated through 90° with the application of force in the insertion direction, that is, toward the base of the bore hole, and results in a 90° rotation of the tension of member 2. As a result, tension member 2 is uncoupled from the bearing support 1, not FIG. 7, and is pulled out of the bore hole 25 by the insertion tool 21, which continues to grip beneath the sleeve 5, with the shoulders 9 centering the annular disks 3. The tension force acting on the annular disks 3 for retaining them in the conically-shaped condition is relieved, and as a result, they widen radially outwardly into the flattened condition, as shown in FIG. 8 so that the disks are located within the widened undercut 27. In FIGS. 8 and 9, the support bearing 1 is shown rotated through 90° as compared to FIGS. 6 and 7 for clarifying an additional function of the lugs 19.

In FIG. 9, the expansion dowel assembly is shown in actual use. An elongated connecting member 29 has an axially extending threaded stud 31 at its leading end which extends through the opening in the annular disks 3 and is screwed into the thread 17 in the support bearing 1. Between the threaded part of the stud 31 and the leading end of the connecting member there is an extension 32, free of any threads, which contacts the inner ends of the lugs 19 and presses them radially outwardly beyond the outer circumferential surface of the support bearing as the connecting member is threaded into the support bearing. As a result, the extension 32 presses the lugs 19 against the surface of the bore hole 25. The outward pressing of the lugs 19 prevents the rotation of the support bearing, particularly when the annular disks 3 are clamped between a head portion 33 on the connecting member and the trailing end of the support bearing 1. The head portion 33 of the bearing member has a threaded bore extending inwardly from its trailing end in which a threaded bolt 35 is engaged. The bolt 35 clamps, via a shim or washer 36, an object 37, to be attached to the exterior surface of the receiving material 26. When the bolt 35 is tightened, the connecting member 29 is pulled toward the trailing end of the bore hole, that is toward the opening end of the bore hole and leads to a comparable displacement of the support bearing 1 out of the bore hole and the placement of the annular disks in contact with the shoulder 28 at the trailing end of the widened undercut 27. By appropriately tightening the bolt 35, the annular disks are pulled in the direction out of the bore hole 25 and are elastically deformed into the shape of a flattened cone, not FIG. 9. Because of this deformation, any relaxation of the receiving material 26, can be compensated and dynamic loads can be carried by the expansion dowel assembly without any impairment of the anchorage of the assembly within the bore hole.

While specific embodiments of the invention have been shown and described in detail to illustrate the application of the inventive principles, it will be understood that the invention may be embodied otherwise without departing from such principles.

We claim:

1. An expansion dowel assembly for insertion into a bore hole formed in a hard receiving material, with the assembly having a leading end inserted first into the bore hole and a trailing end with an insertion direction extending from the trailing end to the leading end direction and comprising expansion members displaceable radially outwardly by elastic force, an axially extending sleeve-like support bearing having a leading end and a trailing end relative to the insertion into the bore hole, load engagement means in said support bearing, said support bearing located closer to the leading end of said expansion dowel assembly relative to said expansion members, a detachable tension member retaining said expansion members on said support bearing in a radially inwardly displaced position, wherein the improvement comprises said expansion members are radially slotted annular disks formed of a spring plate material positioned in the radially inwardly displaced position between said support bearing and said tension member and being releasable into a radially outwardly displaced position by the removal of said tension member, said tension member comprises a shaft elongated in the trailing end-leading end direction and a sleeve fitted on said shaft and secured by noses on said shaft at the trailing end thereof, and said sleeve having conically-shaped outside surfaces supporting said annular disks in the radially inwardly displaced position with said annular disks located between said conically-shaped supports and the trailing end of said bearing support with the trailing end of said bearing support forming a conically-shaped surface supporting the leading ends of said annular disks.

2. Expansion dowel assembly, as set forth in claim 1, wherein the engagement surfaces between said tension member and said annular disks extend radially outwardly beyond the engagement surfaces of said annular disks with said support bearing.

3. Expansion dowel assembly, as set forth in claim 2, wherein the engagement surfaces of said tension member with said annular disks are formed by end surfaces of said tension member adjacent the trailing end thereof with the engagement surfaces of said tension member forming at least a portion of a conical surface widening in the direction opposite to the insertion direction.

4. Expansion dowel assembly, as set forth in claim 2, wherein the engagement surface of said support bearing with said annular disk comprises an axially extending end surface of said support bearing at the trailing end thereof being conically shaped and widening in the direction opposite to the insertion direction.

5. Expansion dowel assembly, as set forth in claim 3, wherein the engagement surface of said support bearing with said annular disk comprises an axially extending end surface of said support bearing at the trailing end thereof being conically shaped and widening in the direction opposite to the insertion direction.

6. Expansion dowel assembly, as set forth in claim 1, wherein said support bearing and said tension member comprise coupling means for effecting mutual locking engagement therebetween and retaining said annular disks in the radially inwardly displaced position.

7. Expansion dowel assembly, as set forth in claim 6, wherein said coupling means are in the form of a bayonet lock.

8. Expansion dowel assembly, as set forth in claim 7, wherein said bayonet lock coupling means comprises lugs in said support bearing and projecting inwardly into an axially extending bore in said support bearing, said lugs being radially displaceable outwardly beyond a circumferentially extending outside surface of said support bearing.

9. Expansion dowel assembly, as set forth in claim 8, wherein said bayonet lock coupling means comprising support arms at the leading end of said tension member and being located in contact with said lugs and located between said lugs and the leading end of said support bearing.

10. Expansion dowel assembly, as set forth in claim 1, wherein said expansion members comprise a plurality of said annular disks placed one on top of the other and each having an opening through which said tension member extends, said disks being deformable into a conical shape in the radially inwardly displaced position and being in the flat condition in the radially outwardly displaced position.

11. Expansion dowel assembly, as set forth in claim 1, including a connection member insertable through said annular disk in the radially outwardly displaced position into contact with the engagement surfaces in said support bearing for securing an object to the receiving material containing the bore hole into which the assembly is inserted.

12. Expansion dowel assembly, as set forth in claim 11, wherein said support bearing having radially inwardly directed lugs adjacent the leading end thereof and said connecting member being movable into engagement with said lugs for displacing said lugs radially outwardly beyond a circumferentially extending outside surface of said support bearing.

* * * * *